Figure 1:
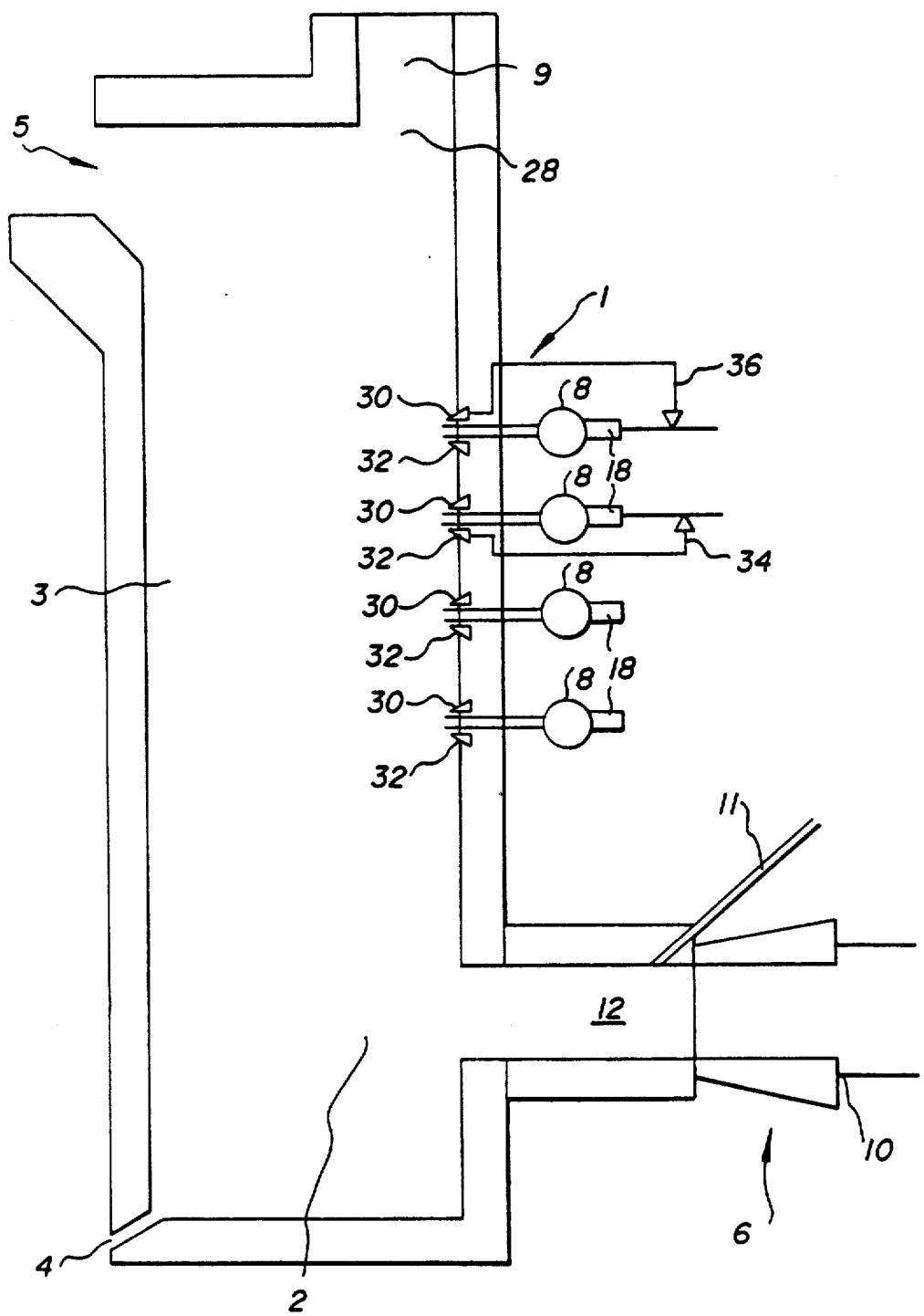

United States Patent [19]

Santén et al.

[11] Patent Number: 4,996,694
[45] Date of Patent: Feb. 26, 1991

[54] METHOD AND APPARATUS FOR MELTING IRON AND STEEL SCRAP

[75] Inventors: Sven Santén, Hofors, Sweden; Jerome Feinman, Grand Junction, Colo.

[73] Assignee: SKF Plasma Technologies AB, Hofors, Sweden

[21] Appl. No.: 352,646

[22] Filed: May 12, 1989

Related U.S. Application Data

[63] Continuation of Ser. No. 183,578, Apr. 19, 1988, abandoned.

[51] Int. Cl.⁵ .............................................. H05B 7/00
[52] U.S. Cl. ........................................ 373/22; 373/25
[58] Field of Search ................ 373/18, 22, 23, 24, 373/25, 1

[56] References Cited

U.S. PATENT DOCUMENTS

| | | | |
|---|---|---|---|
| 4,019,895 | 4/1977 | Santen | 373/18 |
| 4,340,420 | 7/1982 | Santen et al. | 373/18 |

Primary Examiner—Roy N. Envall, Jr.
Attorney, Agent, or Firm—Armstrong, Nikaido, Marmelstein, Kubovcik & Murray

[57] ABSTRACT

A method for melting iron and steel scrap wherein scrap is fed through a shaft furnace countercurrent to a reducing gas. The reducing gas is formed by passing air through a plasma generator and injecting coal and/or hydrocarbon into the hot air so that the ratio $(CO_2+H_2O)/(CO_2+H_2O+CO+H_2)$ of the resulting gas becomes less than 0.2. The energy needed for melting is supplied as sensible heat of the reducing gas. The energy for preheating the scrap is supplied by introducing oxygen containing gas into the preheating zone at a plurality of positions along the flow path of the reducing gas to provide stepwise combustion of the reducing gas. The introduction of the oxygen containing gas at said plurality of positions is balanced to keep the gas reducing to the metal scrap at scrap temperatures above 1000° C., and preferably even above 800° C. The invention also comprises an apparatus for carrying the method into effect, and the apparatus comprises means corresponding to the various method features above.

10 Claims, 2 Drawing Sheets

METHOD AND APPARATUS FOR MELTING IRON AND STEEL SCRAP

This application is a continuation of application Ser. No. 183,578 filed Apr. 19, 1988 now abandoned.

The invention refers to a method for melting iron and steel scrap, wherein a shaft furnace is used having a melting zone in the lower part thereof and a preheating zone in the upper part thereof, the method also comprising the steps of supplying the energy needed for melting as sensible heat of a reducing gas, which preferably is formed by passing air through a plasma generator and injecting coal and/or hydrocarbon into said gas, and supplying the heat needed for the preheating by introducing oxygen containing gas into the preheating zone to combust the reducing gas so that the gas leaving the preheating zone is substantially completely combusted.

The invention also comprises an apparatus for carrying the method into effect.

The prior art includes use of electric arc furnaces and induction furnaces and furnaces that rely on the combustion of fossil fuel such as cupola furnaces. Other methods have been tried, but the two types mentioned above represent the great majority being used today.

Electric furnaces have the disadvantage that electric energy is relatively expensive in many locations, and since modern high-power furnaces are very efficient, further cost reductions are limited.

Cupola furnaces and other furnaces and that use fossil fuel combustion have the disadvantage of comparatively high total energy consumption, because excess fuel must be used to prevent the iron and steel from being oxidized when it is heated above a certain temperature, for example above about 1000° C. Cupola furnaces also have coke fed at the top, and this further helps to induce a high CO content in the off gas.

The prior art also comprises a process wherein the sensible heat of reducing gas which has been heated in a plasma burner is used to melt metal, and the preheating of the metal to the melting temperature is brought about by combustion of said reducing gas.

An object of the present invention is to provide a method and an apparatus that uses a combination of electric energy and fossil fuel energy in such a way that the cost of iron and steel scrap melting is very low, without sacrificing any of the advantages of conventional scrap melting method in producing the desired quality of liquid metal for further refining. It is a further object of this invention to provide for scrap melting with the least possible energy consumption and with a relatively low investment cost.

The inventive method comprises melting iron and steel scrap in a furnace having a melting zone in the lower part thereof and a preheating zone in the upper part thereof into which the scrap is fed, and supplying the energy needed for melting as sensible heat of a reducing gas, and supplying the heat needed for preheating by introducing oxygen containing gas into the preheating zone to combust the reducing gas so that the gas leaving the preheating zone is substantially completely combusted, and against this background, the inventive method also comprises the steps of using a reducing gas having an oxygen potential which is less than 0.2, and by introducing the oxygen containing gas into the preheating zone at a plurality of positions along the flow path of the reducing gas, for stepwise combustion of the reducing gas, and balancing the introduction of the oxygen containing gas at said plurality of positions to keep the metal scrap at scrap temperatures above 1000° C.

The oxygen potential is herein defined as the ratio $(CO_2+H_2O)/(CO_2+H_2O+CO+H_2)$.

Preferably the method is performed so that the gas is kept in a reducing state with respect to the metal scrap at scrap temperatures above 800° C. Preferably the reducing gas is formed by passing air through a plasma generator and injecting carbonaceous material (for example coal and/or hydrocarbon) into said air.

Essential features of the inventive apparatus are that the preheating zone thereof has, at a plurality of positions along the flow path of reducing gas and scrap, means for introducing oxygen containing gas into the preheating zone, for stepwise combustion of the reducing gas, and means for balancing the introduction of the oxygen containing gas at said plurality of positions, to keep the gas in a reducing state with respect to to the metal scrap when the scrap temperatures are above 1000° C., and preferably above 800° C.

Other objects and features of the invention will appear in the following.

Figure 2:
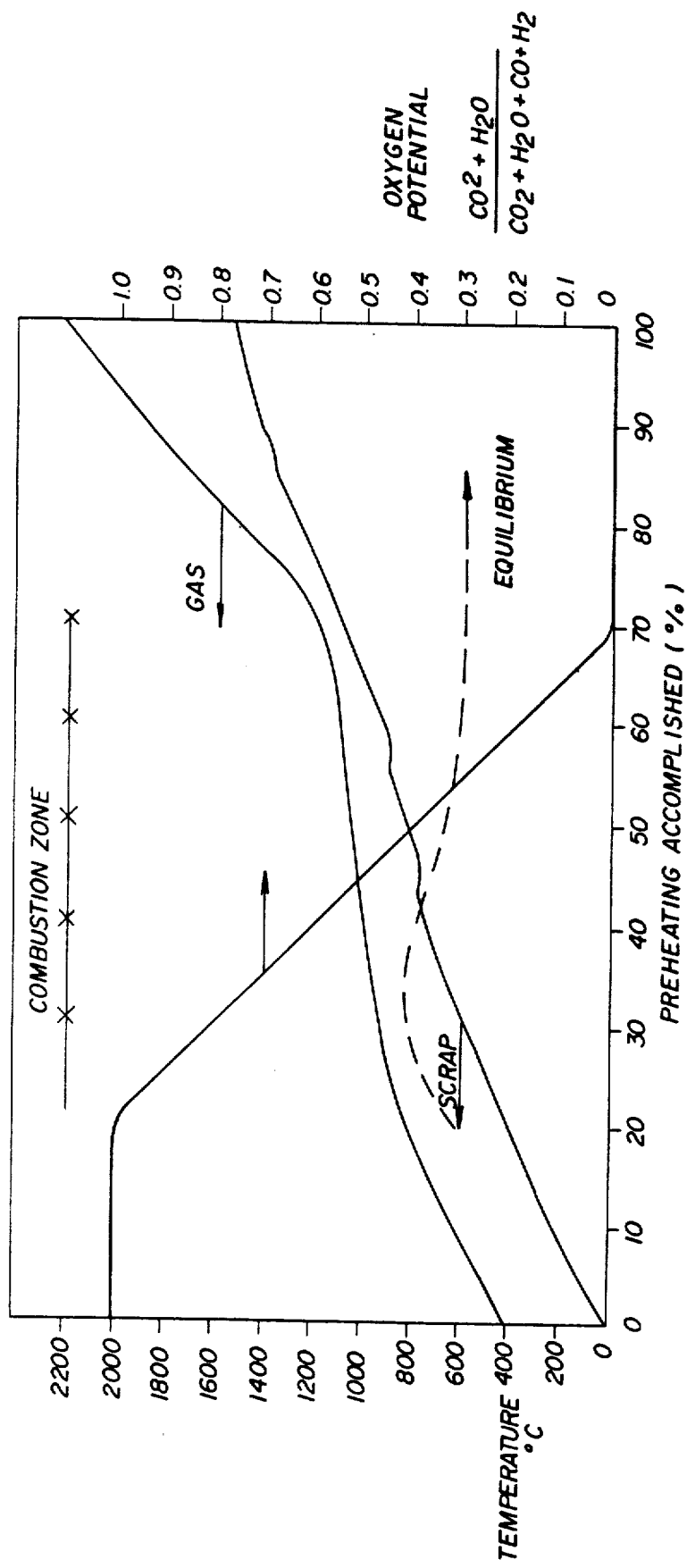

The method and apparatus will in the following description be illustrated with reference to the appended drawing in which:

FIG. 1 schematically shows a longitudinal cross-section of a furnace for carrying out the inventive method in a preferred manner;

FIG. 2 is a plot showing the idealized temperature and gas composition profiles for the components of the process of this invention.

The furnace 1 comprises a melting zone 2, surmounted by a preheating zone 3 which is provided with a tapping means 4 at the bottom of the melting zone for withdrawing metal and slag, and an opening 5 near the top of the preheating zone for feeding scrap. The melting zone 2 is provided with a number of openings for introducing hot plasma gas from a plasma generator system 6 which will be described in detail later herein. The plasma generator system 6 is preferable and may even be critical to the effective operation of the invention.

The preheating zone 3 is provided with at least three (3) levels of tuyeres 8, fed via lines 18, for introducing combustion air. The number of levels of tuyeres is of essential interest as to the effective operation of the present invention as will be explained. The top of the preheating lane 3 is also provided with an opening 28 and a conduit 9 for conducting off gas from the furnace to suitable cleaning and disposal equipment, which are well known and conventional and will not be discussed further herein.

The plasma generator system 6 comprises a nontransferred arc plasma generator 10, means 11 for injecting coal, powder or other suitable fossil fuel downstream of the generator outlet, and a reaction volume 12 wherein the fossil fuel is burned and gasified to essentially $CO+H_2$. In the preferred manner of operation, the plasma generator 10 is operated with air as the plasma gas in such ratio to the coal injected, that 100 to 120% of the carbon needed to reduce the oxygen in the air to CO is provided.

The tuyeres 8 in the preheating zone 3 are operated by suitable means, in such a manner as to maintain the oxygen potential in the reducing gas at a level close to or below the equilibrium value for oxidation of iron at the iron surface temperature in that vicinity when that temperature is ≥ ~800° C. Below this temperature, the kinetics of oxidation of iron are very slow. This is accomplished by controlling the amount of combustion air admitted at each level to limit the energy generated by local combustion to that required to maintain the desired conditions, that is to keep the gas in a reducing state with respect to the metal scrap at scrap temperatures above about 800° C. The critical operating parameters will be explained more fully in the following description of the preferred method of operation.

There is provided means 30 for measuring the temperature, and means 32 for measuring the oxygen potential, of the contents of the preheat zone in the vicinity of each point of injection of oxygen containing gas, and means 36 and 34, respectively for controlling the flow of oxygen containing gas into the preheat zone in response to the measured temperature and oxygen potential.

The preferred method of operation is illustrated in FIG. 2 which shows the gas temperature, oxygen potential and the scrap temperature as a function of the percentage of preheating accomplished. Also shown, superimposed on FIG. 2, is the equilibrium oxygen potential for the scrap at the actual scrap temperature. FIG. 2 is idealized in the sense that sufficient shaft height (residence time) is provided to allow equalization of the scrap temperature (i.e. equivalent to infinite conductivity). FIG. 2 was constructed amusing five (5) equally spaced levels of air introduction in the preheating zone, at which 70, 60, 50, 40 and 30%, respectively of the preheating was accomplished. When operating in this manner, the gas oxygen potential does not cross over into the oxidizing state with respect to the scrap until the scrap temperature is about 800° C. The difference between the actual oxygen potential and the equilibrium value increases as the gas passed to the top of the shaft, in contact with scrap that is progressively lower in temperature. The maximum difference occurs when the scrap temperature is about 400° C., where oxidation rates are known to be negligible. (In fact, oxidation rates for carbon steel are negligible below about 650° C.) A further important condition is illustrated in FIG. 2 at the interface of the melting and the preheating zone (with respect to the gas flow). Here the gas temperature is rather high with respect to the scrap temperature, so that considerable preheating can still be done before it is necessary to begin secondary combustion. This will provide a further cushion against promoting conditions for oxidizing scrap.

A further important condition is associated with the partial combustion of the coal with oxygen in the plasma gas, (in the present case the air plasma gas). At the stoichiometric ratio (SR) used in the inventive context, (SR=1.0 for complete combustion to $CO_2$ and $H_2O$) about 0.5, the residence time required for high combustion efficiency (CE) (defined as the ratio of carbon oxidized to CO or $CO_2$ to the total carbon input) is at least 0.1 seconds, which defines the minimum volume for the reaction volume 12.

The advantages of melting iron and steel scrap according to the method of this invention are shown in the following table 1, which presents a summary of operating requirements per tonne of liquid steel for operation with complete combustion and no extra coal in the melting zone, and for complete combustion with 10% extra coal in the melting zone (for carburization). The electric energy consumption is about ⅓ of the total energy consumption, which is about 30% of the electric energy consumption for a typical electric arc furnace.

TABLE 1

Summary of operating requirements per tonne of liquid steel (Calculatd)

| | | Coal | |
| --- | --- | --- | --- |
| | Unit | Complete Combustion | 10 Percent Extra Coal |
| Inputs | | | |
| Scrap | tonne | 1.0 | 1.0 |
| Limestone | kg (dry) | 5.2 | 5.8 |
| Coal | kg (dry) | 37.9 | 41.7 |
| Plasma gas (air) | kmoles | 1.52 | 1.52 |
| Combustion Air | kmoles | 12.62 | 12.81 |
| Electricity | kWh | 159 | 159 |
| Outputs | | | |
| Steel | tonne | 1.0 | 1.0 |
| Slag (molar basicity = 1) | kg | 6.3 | 6.8 |
| Offgas | kmoles | 14.64 | 14.84 |
| Total energy consumption | kWh | 488 | 521 |

We claim:

1. A method of melting scrap iron or steel comprising: downwardly feeding said scrap into an upper, preheat zone of a shaft furnace; reacting an oxygen plasma with a reducing material under conditions sufficient to produce a reducing gas having an oxygen potential of less than 0.2 and an elevated temperature; feeding said reducing gas into a lower, melt zone of said furnace under conditions sufficient to melt said scrap; passing said reducing gas upwardly through said shaft furnace countercurrent to said downwardly progressing scrap; monitoring the oxygen potential of said rising reducing gas and the temperature of said falling scrap at a plurality of positions along the height of said shaft; and introducing oxygen into said shaft, under conditions sufficient to support the combustion of reducing gas, at said plurality of positions in a proportion relative to the temperature of said scrap at said position and the oxygen potential of the reducing gas at said position sufficient to progressively increase the temperature of said scrap in its downward passage and to progressively decrease the oxygen potential of said reducing gas in its upward passage, but maintaining said gas in a reducing state while in contact with said scrap, such that the gas leaving the shaft furnace is substantially fully combusted.

2. A method according to claim 1, wherein the introduction of oxygen containing gas at said plurality of positions is sufficient to keep the gas in a reducing condition with respect to the metal scrap at scrap temperatures above 800° C.

3. A method according to claim 1, comprising forming the reduced gas by passing air through a plasma generator and then interjecting at least one of coal and hydrocarbon into the air.

4. Apparatus for melting iron and steel scrap, comprising a shaft furnace having a melting zone in the lower part thereof and a preheating zone in the upper part thereof, means for producing a hot reducing gas, means for introducing the hot reducing gas into the melting zone, and means for introducing oxygen containing gas into the preheating zone for combustion of the reducing gas to preheat the scrap, characterized by openings for introducing oxygen containing gas at a plurality of positions along the flow path of the reducing gas in the preheating zone, means to measure the scrap temperature and the oxygen potential of the reducing gas at said positions, and means for balancing the introduction of the oxygen containing gas to maintain the gas composition in said preheating zone in a reducing condition relative to the metal scrap at a temperature above 1000° C.

5. Apparatus according to claim 4, wherein the means for forming a hot reducing gas comprises a plasma generator, means for passing air through the plasma generator, and means for injecting at least one of coal and hydrocarbon into the output gas of the plasma generator.

6. Apparatus according to claim 4 or 5, characterized by means for controlling the oxygen potential of the reducing gas to less than 0.2.

7. Apparatus according to claim 6, characterized in that the means for balancing the introduction of oxygen containing gas is arranged to keep the gas in a reducing condition with respect to the metal scrap at scrap temperatures above 800° C.

8. Apparatus according to claim 4 or 5, characterized in that there are at least three positions for introducing oxygen containing gas into the preheating zone along the flow path of the reducing gas.

9. Apparatus according to claim 6, characterized in that there are at least three levels of openings for introducing oxygen containing gas into the preheating zone along the flow path of the reducing gas.

10. Apparatus according to claim 7, characterized in that there are at least three levels of openings for introducing oxygen containing gas into the preheating zone along the flow path of the reducing gas.

* * * * *